United States Patent
Akatsuka et al.

(10) Patent No.: US 12,214,833 B2
(45) Date of Patent: Feb. 4, 2025

(54) STEER-BY WIRE STEERING SYSTEM

(71) Applicants: TOYOTA JIDOSHA KABUSHIKI KAISHA, Toyota (JP); JTEKT Corporation, Kariya (JP)

(72) Inventors: Kosuke Akatsuka, Mishima (JP); Yoshio Kudo, Machida (JP); Takahito Ishino, Numazu (JP); Kenji Yoshida, Nagoya (JP); Koji Anraku, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 219 days.

(21) Appl. No.: 17/893,249

(22) Filed: Aug. 23, 2022

(65) Prior Publication Data

US 2023/0063519 A1    Mar. 2, 2023

(30) Foreign Application Priority Data

Aug. 26, 2021   (JP) ................... 2021-137991

(51) Int. Cl.
*B62D 6/00* (2006.01)
*B62D 5/00* (2006.01)
*B62D 15/02* (2006.01)

(52) U.S. Cl.
CPC ............. *B62D 6/008* (2013.01); *B62D 5/006* (2013.01); *B62D 15/025* (2013.01)

(58) Field of Classification Search
CPC ..... B62D 6/008; B62D 5/006; B62D 15/0285
See application file for complete search history.

(56) References Cited

U.S. PATENT DOCUMENTS

| | | | |
|---|---|---|---|
| 9,908,557 B2 | 3/2018 | Yamada | |
| 2005/0273236 A1* | 12/2005 | Mori | B60T 8/1755 701/41 |
| 2007/0288145 A1* | 12/2007 | Maeda | B62D 15/0285 701/41 |
| 2017/0029013 A1* | 2/2017 | Oya | B62D 5/006 |

(Continued)

FOREIGN PATENT DOCUMENTS

| | | |
|---|---|---|
| EP | 3835174 A1 | 6/2021 |
| JP | 5994868 B2 | 9/2016 |

(Continued)

*Primary Examiner* — Long T Tran
(74) *Attorney, Agent, or Firm* — Sughrue Mion, PLLC (57) ABSTRACT

A steer-by-wire steering system for a vehicle, comprising: an operation member operable by a vehicle driver; an urging device configured to generate an urging force to urge the operation member; a steering device configured to steer a wheel; and a controller configured to control the urging device and the steering device. In a normal operation, the controller enables the wheel to be steered in accordance with an operation of the operation member and causes the urging force to function as an operation reaction force against the operation of the operation member. In an automatic steering operation in which the wheel is steered without depending on the operation of the operation member, the controller enables the operation member to be moved in accordance with steering of the wheel by the urging force and causes at least part of the urging force generated in the normal operation not to be generated.

9 Claims, 5 Drawing Sheets

(56) References Cited

U.S. PATENT DOCUMENTS

| | | | |
|---|---|---|---|
| 2018/0154936 A1* | 6/2018 | Yamasaki | B62D 15/0285 |
| 2020/0269920 A1* | 8/2020 | Millsap | B60W 50/10 |
| 2020/0391789 A1 | 12/2020 | Kim | |
| 2021/0309292 A1 | 10/2021 | Suzuki | |
| 2022/0009547 A1* | 1/2022 | Osajima | B62D 5/0463 |
| 2022/0081023 A1* | 3/2022 | Miyake | B62D 5/0469 |
| 2022/0097755 A1* | 3/2022 | Shibata | B62D 6/002 |
| 2022/0227416 A1 | 7/2022 | Suzuki | |

FOREIGN PATENT DOCUMENTS

| | | |
|---|---|---|
| WO | 2020/031294 A1 | 2/2020 |
| WO | 2020/230307 A1 | 11/2020 |

* cited by examiner

| | NORMAL OPERATION | AUTOMATIC STEERING OPERATION |
|---|---|---|
| ASSIST COMPONENT $T_{qc\text{-}A}$ | ○ | ○ |
| COMPENSATION COMPONENT $T_{qc\text{-}C}$ | ○ | ✕ |
| POSITIVE-MOVEMENT COMPONENT $T_{qc\text{-}M}$ | ✕ | ○ |
| STEERING-LOAD-DEPENDENT COMPONENT $T_{qc\text{-}L}$ | ○ | ✕ |

GENERATED: ○   NOT GENERATED: ✕

FIG.5

STEER-BY WIRE STEERING SYSTEM

CROSS REFERENCE TO RELATED APPLICATION

The present application claims priority to Japanese Patent Application No. 2021-137991, which was filed on Aug. 26, 2021, the disclosure of which is herein incorporated by reference in its entirety.

BACKGROUND

Technical Field

The following disclosure relates to a steering system for vehicles.

Description of Related Art

A steering system has been recently proposed in which a steering device including a drive source enables a wheel to be steered in accordance with an operation of an operation member, such as a steering wheel, without depending on an operation force applied to the operation member by a driver of a vehicle. That is, what is called steer-by-wire steering system has been proposed. The steer-by-wire steering system includes a reaction-force application device to apply, to the operation member, an operation reaction force that is a reaction force against the operation of the operation member, namely, the steer-by-wire steering system includes an urging device configured to generate an urging force for urging the operation member. As disclosed in Japanese Patent No. 5994868, for instance, the urging device generates the urging force composed of some components to apply the operation reaction force and changes a ratio of the components depending on situations.

SUMMARY

In a case where a vehicle is automatically parked, the steering system performs an automatic steering operation, for instance. In the automatic steering operation, a wheel is automatically steered without the operation member being operated. In the steer-by-wire steering system, the wheel to be steered and the operation member are not mechanically coupled. It is thus possible to utilize the urging force of the urging device to enable the operation member to be moved in accordance with steering of the wheel in the automatic steering operation. The urging device described above is, however, designed to generate the urging force in an attempt to apply the operation reaction force. It is thus expected that an appropriate movement of the operation member based on the steering of the wheel is not ensured if the urging force composed of some components indicated above is generated. In other words, there is a possibility that the operation member unnaturally moves. Such an unnatural movement of the operation member undesirably lowers the utility of the steer-by-wire steering system. Accordingly, an aspect of the present disclosure is directed to a steer-by-wire steering system with high utility.

In one aspect of the present disclosure, a steer-by-wire steering system for a vehicle includes: an operation member operable by a driver of the vehicle; an urging device configured to generate an urging force to urge the operation member; a steering device configured to steer a wheel; and a controller configured to control the urging device and the steering device. In a normal operation, the controller enables the wheel to be steered in accordance with an operation of the operation member and causes the urging force to function as an operation reaction force against the operation of the operation member. In an automatic steering operation in which the wheel is steered without depending on the operation of the operation member, the controller enables the operation member to be moved in accordance with steering of the wheel by the urging force and causes at least part of the urging force generated in the normal operation not to be generated.

The steer-by-wire steering system according to the present disclosure does not generate, in the automatic steering operation, at least part of the urging force generated by the urging device and functioning as the operation reaction force in the normal operation. Thus, the operation member moves appropriately in accordance with the steering of the wheel.

Various Forms

While situations in which the automatic steering operation of the steering system according to the present disclosure is performed are not limited, the automatic steering operation of the present steering system is preferably applicable to automatic parking in which the wheel is automatically steered without depending on the operation of the operation member by the vehicle driver. For instance, it is proposed to transport the vehicle by automated driving in facilities such as production plants, namely, automated-driving transportation is proposed. The automatic steering operation of the present steering system is preferably applicable to the automated-driving transportation.

As described above, the urging force may be composed of various components. For instance, the urging force generated in the normal operation may include an assist component for assisting the operation of the operation member by the driver, a compensation component for compensating an operation feeling of the operation member given to the driver, and a steering-load-dependent component that is based on a load of the steering device with respect to the steering of the wheel.

Specifically, the assist component is a component similar to an assist force in what is called power steering. For instance, the assist component may be a component that increases with an increase in the operation force applied by the driver to the operation member.

The compensation component may include a return compensation component, a hysteresis compensation component, a damping compensation component, and an inertia compensation component, for instance. The return compensation component is a component for returning or retaining the operation member to or at an operational position thereof in a straight traveling sate of the vehicle (hereinafter referred to as "neutral position" where appropriate). The hysteresis compensation component is a component for imitating a hysteresis characteristic due to mechanical friction in the operation of the operation member. The damping compensation component is a component for viscously preventing or reducing a micro-vibration generated in the operation member. The inertia compensation component is a component for preventing or reducing a catching feeling (response lag) at the start of the operation of the operation member and a carried-away feeling (overshoot) at the end of the operation of the operation member.

The steering-load-dependent component is considered as a main component of the operation reaction force. The steering-load-dependent component is a component for causing the vehicle driver to feel a steering force necessary for steering the wheel. The steering-load-dependent component is considered as a component based on an axial force that acts on a steering rod (which may also be referred to as a rack bar) coupling right and left wheels in ordinary steering systems. The steering-load-dependent component is a concept widely including not only the steering force described above but also a force that acts on the wheel from the road surface. The steering-load-dependent component acts in a direction generally opposite to a direction in which the assist component acts. That is, the assist component acts in the same direction as the operation direction of the operation member, and the steering-load-dependent component acts in the direction opposite to the operation direction of the operation member.

The steering-load-dependent component may include a theoretical component, an actual-load dependent component, a steering-end-dependent component, and a steering-hysteresis-dependent component, for instance. The theoretical component is a component based on an operation amount of the operation member or a steering amount of the wheel. The actual-load dependent component indicates an actual load obtained based on a supply current to an electric motor in a case where the steering device includes the electric motor as a drive source. The steering-end-dependent component is a component for causing the vehicle driver to feel steering ends. The steering-hysteresis-dependent component is a component based on a hysteresis characteristic of the steering device.

The components described above can be generated in the normal operation. In contrast, a positive-movement component can be generated in the automatic steering operation. The positive-movement component is a component for causing the operation member to positively move in accordance with the steering of the wheel, so as to enable the operation member to move in accordance with the steering of the wheel. It is desirable that the positive-movement component function as a main urging force in the automatic steering operation. In view of a possibility that the assist component, the compensation component, the steering-load-dependent component, etc., which constitute the operation reaction force, may impair an appropriate movement of the operation member in the automatic steering operation, it is desirable not to generate at least part of those components in the automatic steering operation, namely, it is desirable not to generate at least part of all components except for the positive-movement component in the automatic steering operation. The at least part of the components not to be generated in the automatic steering operation will be hereinafter referred to as a non-generating component.

The positive-movement component is determined as follows, for instance. The operation amount of the operation member corresponding to the steering amount of the wheel is determined as a target operation amount based on the steering amount of the wheel. Based on a deviation of an actual operation amount with respect to the target operation amount, the positive-movement component is determined according to the feedback control law.

In a case where the positive-movement component is generated only in the automatic steering operation, it is expected that the operation member abruptly moves in a changeover between generation of the positive-movement component and non-generation of the positive-movement component. It is thus desirable to gradually increase the positive-movement component when the automatic steering operation starts and to gradually decrease the positive-movement component in returning to the normal operation, namely, when the automatic steering operation ends. Meanwhile, if the non-generating component is abruptly changed at the start of the automatic steering operation, the operation member is expected to abruptly move due to the abrupt change of the non-generating component. In view of this, it is desirable to gradually decrease the non-generating component when the automatic steering operation starts.

One example of the configuration in which the steering system does not generate at least part of the non-generating component in the automatic steering operation is a configuration in which, in the automatic steering operation, a component for cancelling the at least part of the non-generating component is added to the positive-movement component while the at least part of the non-generating component is kept generated. (The component to be added to the positive-movement component for the cancellation will be hereinafter referred to as "cancelling component" where appropriate.) More specifically, the non-generating component is classified into: a co-directional component that acts in the same direction as a direction in which the positive-movement component acts with respect to the movement of the operation member, namely, with respect to the direction in which the operation member moves; and a counter-directional component that acts in a direction opposite to the direction in which the positive-movement component acts with respect to the movement of the operation member. For causing the counter-directional component not to be generated in the automatic steering operation, a component having the same magnitude as the counter-directional component is added to the positive-movement component to thereby cancel the counter-directional component.

In the configuration in which the cancelling component is added, when the automatic steering operation ends, the controller immediately stops generating, namely, abruptly decreases, both the cancelling component and the at least part of the non-generating component, thereby making it possible to sufficiently reduce or obviate an inappropriate movement of the operation member at the end of the automatic steering operation caused by the at least part of the non-generating component otherwise remaining at the end of the automatic steering operation. In a case where the at least part of the non-generating component to be cancelled is the counter-directional component described above, the controller immediately stops generating, namely, abruptly decreases, both the counter-directional component and the above-indicated component having the same magnitude as the counter-directional component at the end of the automatic steering operation, thereby making it possible to sufficiently reduce or obviate an inappropriate movement of the operation member at the end of the automatic steering operation caused by the counter-directional component otherwise remaining at the end of the automatic steering operation. The steering-load-dependent component described above is the counter-directional component and will probably remain even after the automatic steering operation ends. Thus, to immediately stop generating the steering-load-dependent component offers a great merit.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be described below in detail a steer-by-wire steering system according to one embodiment of the present disclosure. It is to be understood that the present disclosure is not limited to the details of the following embodiment but may be embodied based on the forms described in Various Forms and may be changed and modified based on the knowledge of those skilled in the art.

A. Hardware Configuration of Steering System

Figure 1:
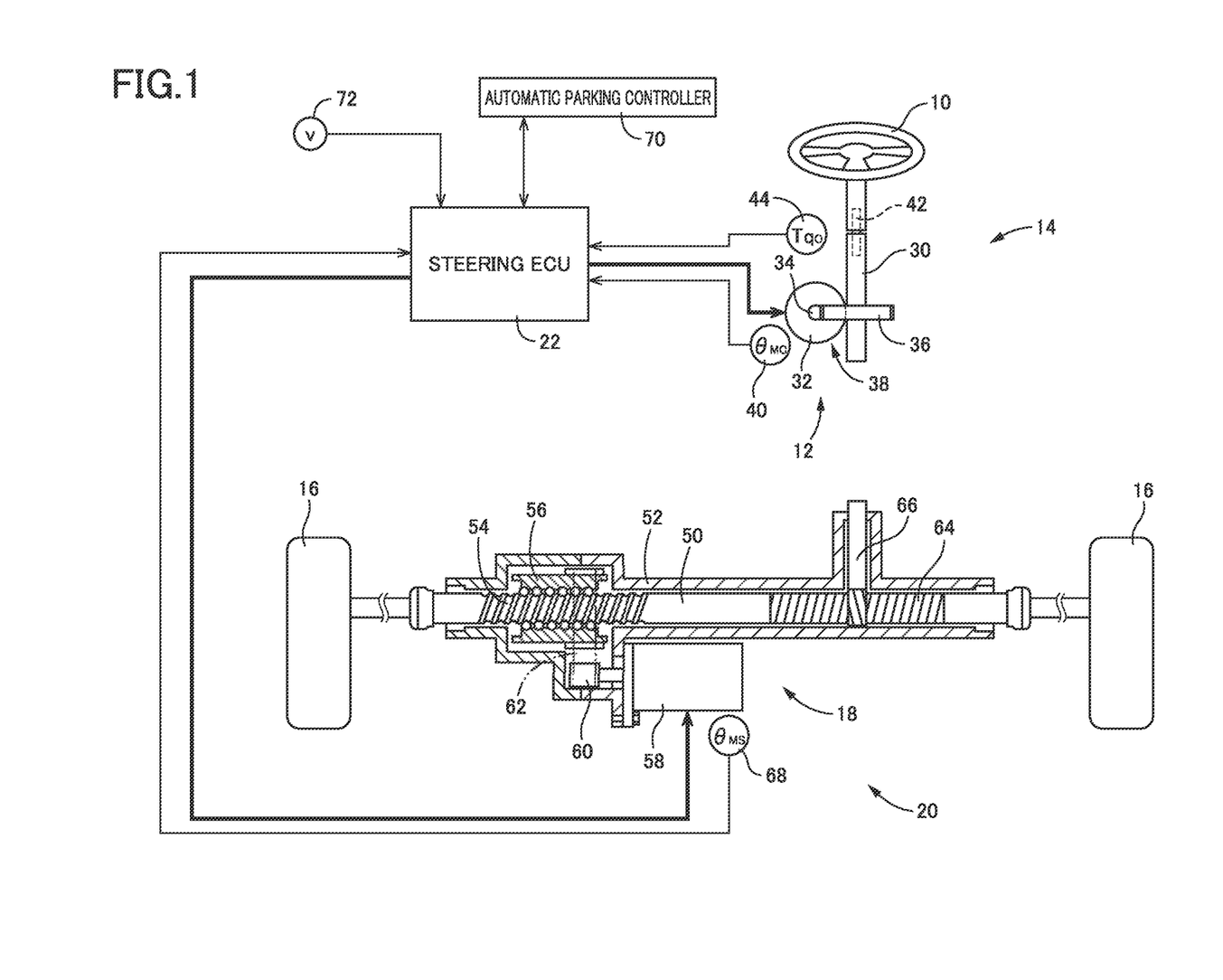
FIG. 1 is a view schematically illustrating a hardware configuration of a steering system according to one embodiment of the present disclosure.

As schematically illustrated in FIG. 1, a steering system according to the present embodiment is of a steer-by-wire type. The steering system includes: a steering wheel 10 (as one example of an operation member) operable by a vehicle driver; an operation portion 14 including a reaction force actuator 12 for applying an operation reaction force to the steering wheel 10; a steering portion 20 including a steering actuator 18 (as one example of a steering device) for steering a wheel 16; and a steering electronic control unit (hereinafter abbreviated as "steering ECU" where appropriate) 22 configured to control the reaction force actuator 12 and the steering actuator 18. The steering ECU 22 is one example of a controller.

The operation portion 14 will be described. The steering wheel 10 is fixed to a distal end portion of a steering shaft 30. The reaction force actuator 12 includes: a reaction force motor 32, which functions as a force generation source; and a speed reducing mechanism 38 including a worm 34 attached to a motor shaft of the reaction force motor 32 and a worm wheel 36 attached to the steering shaft 30. The reaction force actuator 12 is an urging device configured to generate an urging torque $Tq_C$ that depends on a motor torque of the reaction force motor 32 and to urge, by the urging torque, the steering wheel 10 through the steering shaft 30. (The urging torque is a subordinate concept of an urging force.) The reaction force actuator 12 causes the urging torque $Tq_C$ to function as a reaction force torque $Tq_C$ against the operation of the steering wheel 10, so that the reaction force actuator 12 functions as a reaction-force application device. (The reaction force torque is a subordinate concept of the operation reaction force.) It is noted that the urging torque $Tq_C$ functions mainly as the reaction force torque. Thus, the urging torque $Tq_C$ will be hereinafter referred to as the reaction force torque $Tq_C$ where appropriate.

The reaction force motor 32 is a three-phase brushless motor. The reaction force motor 32 includes a motor rotational angle sensor 40 for detecting a rotational phase of the motor shaft of the reaction force motor 32, that is, for detecting a rotational angle $\theta_{MC}$ of the reaction force motor 32 (hereinafter referred to as "reaction-force-motor rotational angle" where appropriate). The steering shaft 30 includes upper and lower shaft portions coupled to each other via a torsion bar 42. The operation portion 14 includes an operation torque sensor 44 for detecting a torsional amount of the torsion bar 42 to thereby detect an operation torque $Tq_O$ that the vehicle driver applies to the steering wheel 10. (The operation torque is a subordinate concept of an operation force.) The signal indicative of the reaction-force-motor rotational angle $\theta_{MC}$ detected by the motor rotational angle sensor 40 and the signal indicative of the operation torque $Tq_O$ detected by the operation torque sensor 44 are sent to the steering ECU 22.

The steering portion 20 will be described. The steering actuator 18 includes a steering rod 50 extending in the right-left direction and a housing 52 holding the steering rod 50 such that the steering rod 50 is movable in the right-left direction. A threaded groove 54 of a ball screw mechanism is formed on the steering rod 50. A nut 56 holding bearing balls and threadedly engaging with the threaded groove 54 is held by the housing 52 so as to be rotatable and immovable in the right-left direction. A steering motor 58, which is a drive source, is attached to the housing 52. A timing belt 62 is looped over a pulley 60 attached to the motor shaft of the steering motor 58 and an outer circumferential portion of the nut 56 functioning as another pulley. Rotation of the motor shaft of the steering motor 58, namely, rotation of the steering motor 58, causes the nut 56 to be rotated to thereby move the steering rod 50 in the right-left direction. The steering rod 50 has right and left ends coupled, via respective link rods (not illustrated), to respective knuckle arms of right and left steering knuckles that rotatably hold the right and left wheels 16. The movement of the steering rod 50 in the right-left direction causes the right and left wheels 16 to be turned, namely, to be steered.

A rack 64 is formed on the steering rod 50, and a pinion shaft 66 meshing with the rack 64 is rotatably held by the housing 52. The steering actuator 18 of the steer-by-wire steering system according to the present embodiment need not have the rack 64 and the pinion shaft 66. In the present steering system, if the pinion shaft 66 and the steering shaft 30 of the operation portion 14 are coupled, an ordinary power steering system is constructed. That is, the present steering system is constructed by slightly modifying an ordinary power steering system. It is noted that the steering rod 50 with the rack 64 may also be referred to as a rack bar.

The steering motor 58 is a three-phase brushless motor. The steering motor 58 includes a motor rotational angle sensor 68 for detecting a rotational phase of a motor shaft of the steering motor 58, namely, for detecting a rotational angle $\theta_{MS}$ of the steering motor 58 (hereinafter referred to as "steering-motor rotational angle" where appropriate). The signal indicative of the steering-motor rotational angle $\theta_{MS}$ detected by the motor rotational angle sensor 68 is sent to the steering ECU 22.

The steering ECU 22 includes a computer constituted by a CPU, a ROM, a RAM, etc., an inverter functioning as a drive circuit for the reaction force motor 32, and an inverter functioning as a drive circuit for the steering motor 58. As later described in detail, when the vehicle automatically parks, the present steering system performs an automatic steering operation in which the wheel 16 is automatically steered without depending on the operation of the steering wheel 10 by the vehicle driver. To perform the automatic steering operation, the steering ECU 22 is connected to an automatic parking controller 70. The steering ECU 22 receives the signal indicative of a running speed v (hereinafter referred to as "vehicle speed v" where appropriate) of the vehicle from a vehicle speed sensor 72 configured to detect the vehicle speed v.

B. Functions of Controller

Figure 2:
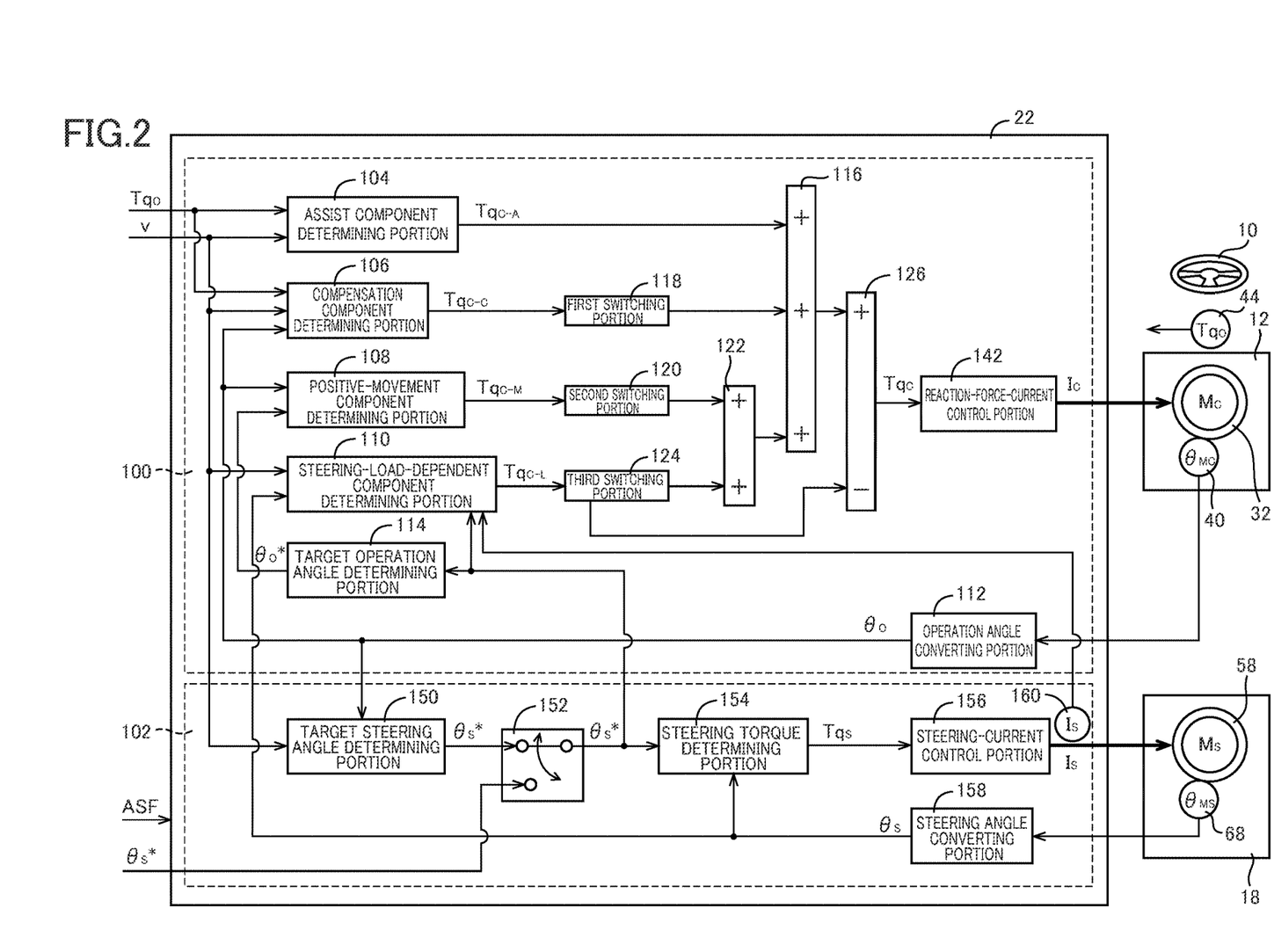
FIG. 2 is a functional block diagram illustrating a functional configuration of a controller of the steering system according to the embodiment.

The steering ECU 22, which is a controller for the present steering system, has a functional configuration illustrated in a functional block diagram of FIG. 2. The computer executes a predetermined program to effectuate the functional configuration. The functional configuration may be effectuated by a dedicated circuit such as an ASIC. The steering ECU 22 is classified roughly into a reaction force control section 100 and a steering control section 102. To and from the constituent elements illustrated in FIG. 2, there are input and output signals indicative of values of a torque, components of the torque, a steering angle, an operation angle, etc. For avoiding redundancy of the description, the following description simply expresses in such a way that the torque, the components of the torque, the steering angle, the operation angle, etc., are input to and output from the constituent elements.

(a) Reaction Force Control Section

The reaction force control section 100 is a functional portion that controls the urging torque $Tq_C$ (reaction force torque $Tq_C$) generated by the reaction force actuator 12, which is the urging device. The reaction force control section 100 includes an assist component determining portion 104 for determining an assist component $Tq_{C-A}$, a compensation component determining portion 106 for determining a compensation component $Tq_{C-C}$, a positive-movement component determining portion 108 for determining a positive-movement component $Tq_{C-M}$, and a steering-load-dependent component determining portion 110 for determining a steering-load-dependent component $Tq_{C-L}$. Each of the assist component $Tq_{C-A}$, the compensation component $Tq_{C-C}$, the positive-movement component $Tq_{C-M}$, and he steering-load-dependent component $Tq_{C-L}$ is a component of the urging torque $Tq_C$.

In the control of the present steering system, an operation angle $\theta_O$ is utilized as an operation amount of the steering wheel 10. Accordingly, the reaction force control section 100 includes an operation angle converting portion 112 for converting the reaction-force-motor rotational angle $\theta_{MC}$ detected by the motor rotational angle sensor 40 of the reaction force motor 32 to the operation angle $\theta_O$. The operation angle $\theta_O$ and a cumulative amount of the reaction-force-motor rotational angle $\theta_M c$ have a relationship to satisfy a speed reduction ratio of the speed reducing mechanism 38. The conversion of the reaction-force-motor rotational angle $\theta_{MC}$ to the operation angle $\theta_O$ is carried out based on the speed reduction ratio. Though not described in detail, the present steering system includes a sensor (not illustrated) for detecting the operation angle $\theta_O$ from the neutral position of the steering wheel 10 (that is a position of the steering wheel 10 in a straight traveling state of the vehicle). Based on the detection value by the sensor, a calibration of the operation angle $\theta_O$ converted by the operation angle converting portion 112 is performed at predetermined timing.

For performing the automatic steering operation, the reaction force control section 100 includes a target operation angle determining portion 114 for determining, as a target operation angle $\theta_O*$, the operation angle $\theta_O$ corresponding to the steering angle $\theta_S$ at the present time point in a state in which the operation angle $\theta_O$ and the steering angle $\theta_S$ indicative of the steering amount of the wheel 16 have a relation to satisfy a specific steering gear ratio $\gamma_0$.

The components of the urging torque $Tq_C$ described above are determined as follows. The assist component $Tq_{C-A}$ is a component similar to an assist force in what is called power steering. The assist component determining portion 104 determines the assist component $Tq_{C-A}$ based on the vehicle speed v and the operation torque $Tq_O$ detected by the operation torque sensor 44. In short, the assist component determining portion 104 determines the assist component $Tq_{C-A}$ to be a greater value with an increase in the operation torque $Tq_O$. Further, the assist component determining portion 104 determines the assist component $Tq_{C-A}$ to be a smaller value when the vehicle speed v is high for giving the vehicle driver a heavy operation feeling with respect to the operation of the steering wheel 10 and to be a greater value when the vehicle speed v is low for giving the vehicle driver a light operation feeling with respect to the operation of the steering wheel 10. The operation feeling of the steering wheel 10 felt by the vehicle driver will be hereinafter referred to as "steering operation feeling" or simply referred to as "operation feeling" where appropriate. The direction of the assist component $Tq_{C-A}$ is the same as the steering operation direction in which the steering wheel 10 is operated.

The compensation component $Tq_{C-C}$ includes: a return compensation component for returning or retaining the steering wheel 10 to or at the neutral position; a hysteresis compensation component for imitating a hysteresis characteristic due to mechanical friction in the operation of the steering wheel 10; a damping compensation component for viscously preventing or reducing a micro-vibration generated in the steering wheel 10; and an inertia compensation component for preventing or reducing a catching feeling (response lag) at the start of the operation of the steering wheel 10 and a carried-away feeling (overshoot) at the end of the operation of the steering wheel 10. The compensation component determining portion 106 determines these components and sums up the determined components, so as to determine the compensation component $Tq_{C-C}$.

Specifically, the return compensation component is determined based on the operation torque $Tq_O$, the vehicle speed v, the operation angle $\theta_O$, and an operation speed $\theta_O'$ obtained by differentiating the operation angle $\theta_O$. In short, where the operation angle $\theta_O$ when the steering wheel 10 is located at the neutral position is defined as a neutral angle, the return compensation component is determined to be a greater value with an increase in a difference between the operation angle $\theta_O$ and the neutral angle. The hysteresis compensation component is determined based on the operation angle $\theta_O$ and the vehicle speed v such that the hysteresis characteristic described above is optimized. The damping compensation component is determined based on the vehicle speed v and the operation speed $\theta_O'$ obtained by differentiating the operation angle $\theta_O$. In short, the damping compensation component is determined to be a greater value with an increase in the operation speed $\theta_O'$. The inertia compensation component is determined based on the vehicle speed v and operation acceleration $\theta_O''$ obtained by differentiating the operation speed $\theta_O'$. In short, the inertia compensation component is determined to be a greater value with an increase in the operation acceleration $\theta_O''$. The direction of the compensation component $Tq_{C-C}$ obtained by summing up these components may be the same as or opposite to the steering operation direction.

The steering-load-dependent component $Tq_{C-L}$ is considered as a main component of the reaction force torque. The steering-load-dependent component $Tq_{C-L}$ is a component for causing the vehicle driver to feel a steering force necessary for steering the wheel 16. The steering-load-dependent component $Tq_{C-L}$ may be considered as a component based on a force that acts on the steering rod 50 of the steering actuator 18 in the axial direction of the steering rod 50, i.e., the axial force. The steering-load-dependent component $Tq_{C-L}$ is a component for causing the vehicle driver to also feel a force that acts on the wheel 16 from the road surface, in addition to the steering force described above. The direction of the steering-load-dependent component $Tq_{C-L}$ is generally opposite to the steering operation direction.

Specifically, the steering-load-dependent component $Tq_{C-L}$ includes: a theoretical component that is based on the operation angle $\theta_O$ of the steering wheel 10, the steering angle $\theta_S$ of the wheel, and so on; an actual-load dependent component that is based on an actual load of the steering actuator 18; a steering-end-dependent component for causing the vehicle driver to feel steering ends of the wheel 16; and a steering-hysteresis-dependent component that is based on a hysteresis characteristic of mechanical friction of the steering actuator 18. The steering-load-dependent component determining portion 110 determines these components and sums up the components, so as to determine the steering-load-dependent component $Tq_{C-L}$.

Specifically, the theoretical component is a component not taking account of friction between the road surface and the wheel 16. The theoretical component is determined based on a target steering angle $\theta_S^*$ that is a steering angle $\theta_S$ to which the wheel 16 should be steered. In short, the theoretical component is determined in consideration of the self-aligning torque of the wheel 16 so as to be a greater value with an increase in the target steering angle $\theta_S$ and with an increase in the vehicle speed v. Here, it is considered that the load of the steering actuator 18 is proportional to a steering current Is, which is a supply current to the steering motor 58. Thus, the actual-load dependent component is determined, based on the steering current Is, so as to be a greater value with an increase in the steering current Is. The steering-end-dependent component is determined, based on the target steering angle $\theta_S^*$, so as to steeply rise when the target steering angle $\theta_S^*$ gets close to each steering end to a certain extent. The steering-hysteresis-dependent component is determined based on the operation angle $\theta_O$ and the vehicle speed v such that the hysteresis characteristic is optimized.

The positive-movement component $Tq_{C-M}$ is for positively moving the steering wheel 10. In the present steering system, the positive-movement component $Tq_{C-M}$ is generated in the automatic steering operation when the vehicle performs automatic parking. The positive-movement component determining portion 108 determines, according to the feedback control law, the positive-movement component $Tq_{C-M}$ based on an operation angle deviation $\Delta\theta_O$, which is a deviation of the operation angle $\theta_O$ at the present time point with respect to the target operation angle $\theta_O^*$ determined by the target operation angle determining portion 114. Specifically, the positive-movement component $Tq_{C-M}$ is determined according to a proportional control, namely, the positive-movement component $Tq_{C-M}$ is determined as a component whose magnitude corresponds to the magnitude of the operation angle deviation $\Delta\theta_O$. In other words, the positive-movement component $Tq_{C-M}$ is determined to be a greater value with an increase in the operation angle deviation $\Delta\theta_O$. The direction of the positive-movement component $Tq_{C-M}$ is the same as a direction in which the steering wheel 10 is moved. Thus, the positive-movement component $Tq_{C-M}$ is a co-directional component with respect to the assist component Tar-A and a counter-directional component with respect to the steering-load-dependent component $Tq_{C-L}$.

The assist component $Tq_{C-A}$ determined by the assist component determining portion 104 is input to the adder 116, and the compensation component $Tq_{C-C}$ determined by the compensation component determining portion 106 is input to the adder 116 via a first switching portion 118. The positive-movement component $Tq_{C-M}$ determined by the positive-movement component determining portion 108 is input to a preliminary adder 122 via a second switching portion 120, and the steering-load-dependent component $Tq_{C-L}$ determined by the steering-load-dependent component determining portion 110 is input to the preliminary adder 122 via a third switching portion 124. The preliminary adder 122 adds up the positive-movement component $Tq_{C-M}$ and the steering-load-dependent component $Tq_{C-L}$ input thereto, and a resultant added component is input to the adder 116. The adder 116 adds up the assist component $Tq_{C-A}$, the compensation component $Tq_{C-C}$, and a sum of the positive-movement component $Tq_{C-M}$ and the steering-load-dependent component $Tq_{C-L}$, and a resultant added component is input to a final adder 126. The steering-load-dependent component $Tq_{C-L}$ determined by the steering-load-dependent component determining portion 110 is input also to the final adder 126 via the third switching portion 124. The final adder 126 subtracts the steering-load-dependent component $Tq_{C-L}$ input by the third switching portion 124 from the component input by the adder 116. As a result, the urging torque $Tq_C$ is determined. Each of the first switching portion 118, the second switching portion 120, and the third switching portion 124 is a functional portion for switching whether or not to generate the corresponding component in a changeover between the normal operation and the automatic steering operation.

Figure 3A:
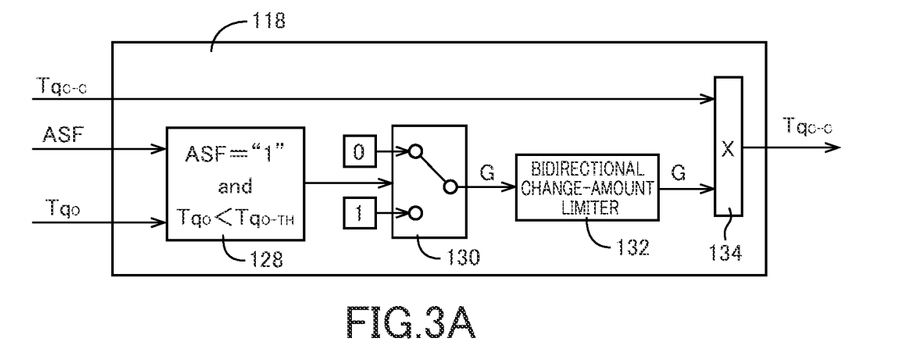
FIG. 3A is a block diagram illustrating a first switching portion included in the functional configuration of the controller.

The first switching portion 118 has a functional configuration illustrated in FIG. 3A. Specifically, the first switching portion 118 includes an operation mode determiner 128, a gain changeover switch 130, a bidirectional change-amount limiter 132, and a multiplier 134. The operation mode determiner 128 receives a flag value of an automatic steering flag ASF from the automatic parking controller 70 and the operation torque $Tq_O$ detected by the operation torque sensor 44. The automatic steering flag ASF is configured such that its flag value is set to "1" (ASF="1") when automatic steering is instructed and set to "0" (ASF="0") when automatic steering is not instructed. The operation mode determiner 128 determines that the operation of the steering system is the automatic steering operation when the following two conditions are satisfied: i) ASF="1"; and ii) the operation torque $Tq_O$ is less than a threshold operation torque $Tq_{O-TH}$, namely, the steering wheel 10 is not being operated by the vehicle driver. The operation mode determiner 128 determines that the operation of the steering system is the normal operation when at least any one of the above two conditions is not satisfied.

Based on the determination made by the operation mode determiner 128, the gain changeover switch 130 outputs "0" in the case of the automatic steering operation and "1" in the case of the normal operation. The bidirectional change-amount limiter 132 prevents an abrupt change of a value of a gain G in a changeover from 1 to 0 and from 0 to 1. Specifically, in a case where the value of the gain G after a lapse of a predetermined cycle time changes from a value before the lapse of the predetermined time by a predetermined value or more, the change of the gain G is made as the predetermined value. The gain G passed through the bidirectional change-amount limiter 132 is input to the multiplier 134. The multiplier 134 also receives the compensation component $Tq_{C-C}$ determined by the compensation component determining portion 106. The multiplier 134 multiplies the compensation component $Tq_{C-C}$ by the gain G, and the compensation component $Tq_{C-C}$ after multiplication is output from the first switching portion 118.

Figure 3B:
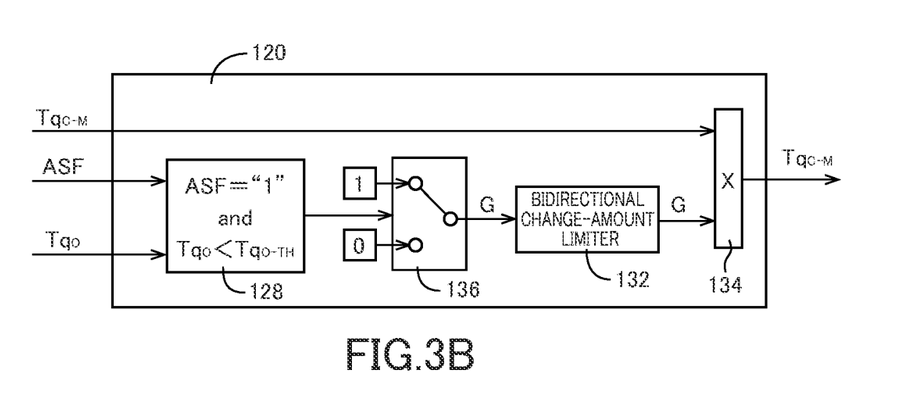
FIG. 3B is a block diagram illustrating a second switching portion included in the functional configuration of the controller.

The second switching portion 120 has a functional configuration illustrated in FIG. 3B. Specifically, the second switching portion 120 includes the operation mode determiner 128, the bidirectional change-amount limiter 132, and the multiplier 134 similar to those of the first switching portion 118. The second switching portion 120 includes a gain changeover switch 136. Unlike the gain changeover switch 130 of the first switching portion 118, the gain changeover switch 136 of the second switching portion 120 outputs "1" in the case of the automatic steering operation and "0" in the case of the normal operation. The positive-movement component $Tq_{C-M}$ determined by the positive-movement component determining portion 108 undergoes the process by the second switching portion 120 and is output from the second switching portion 120.

Figure 3C:
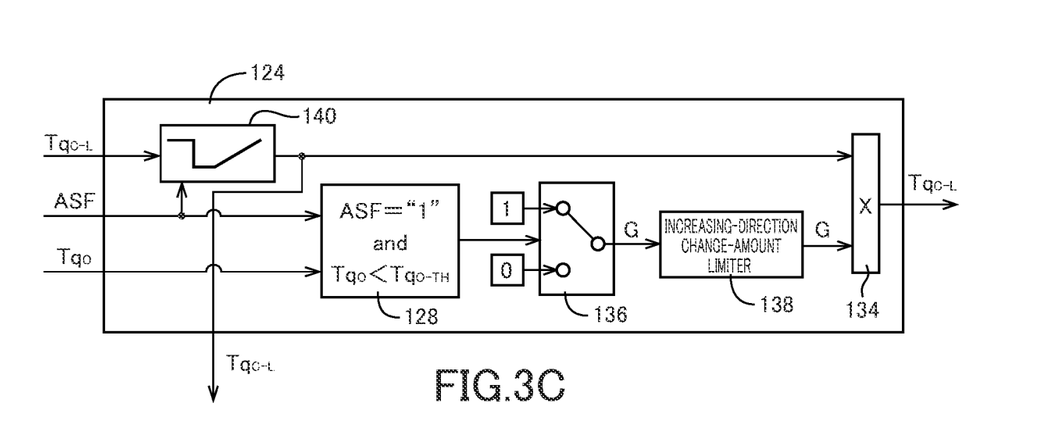
FIG. 3C is a block diagram illustrating a third switching portion included in the functional configuration of the controller.

The third switching portion 124 has a functional configuration illustrated in FIG. 3C. Specifically, the third switching portion 124 includes the operation mode determiner 128 and the multiplier 134 similar to those of the first switching portion 118 and the gain changeover switch 136 similar to that of the second switching portion 120. The third switching portion 124 also includes a change-amount limiter, specifically, an increasing-direction change-amount limiter 138. The increasing-direction change-amount limiter 138 prevents an abrupt change of the value of the gain G in a changeover from 0 to 1 but allows an abrupt change of the value of the gain G in a changeover from 1 to 0.

The third switching portion 124 further includes a resetter 140. The resetter 140 receives the steering-load-dependent component $Tq_{C-L}$ determined by the steering-load-dependent component determining portion 110 and the flag value of the automatic steering flag ASF. When the flag value of the automatic steering flag ASF is set to 0 (ASF="0"), namely, when the automatic steering is not instructed, the resetter 140 resets the steering-load-dependent component $Tq_{C-L}$ to 0 and subsequently gradually increases the steering-load-dependent component $Tq_{C-L}$ from 0 when the normal operation is started thereafter. The steering-load-dependent component $Tq_{C-L}$ processed by the resetter 140 is output therefrom not only to the multiplier 134 but also directly to the final adder 126.

The urging torque $Tq_C$ output from the final adder 126 is input to a reaction-force-current control portion 142. The reaction-force-current control portion 142 includes an inverter that is a drive circuit (driver) for the reaction force motor 32. The reaction-force-current control portion 142 determines a reaction force current $I_C$ to be supplied to the reaction force motor 32 based on the urging torque $Tq_C$ input thereto and supplies the reaction force current $I_C$ form the inverter to the reaction force motor 32.

(b) Steering Control Section

The steering control section 102 is a functional portion configured to control the steering angle $\theta_S$ of the wheel 16 steered by the steering actuator 18, which is the steering device. The steering control section 102 includes a target steering angle determining portion 150, a target steering angle changeover switch 152, a steering torque determining portion 154, and a steering-current control portion 156.

In the control of the present steering system, the steering angle $\theta_S$ is utilized as the steering amount of the wheel 16. Thus, the steering control section 102 includes a steering angle converting portion 158 for converting the steering-motor rotational angle $\theta_{MS}$ detected by the motor rotational angle sensor 68 of the steering motor 58 to the steering angle $\theta_S$. In this respect, though a toe angle of the wheel 16 may be employed as the steering angle $\theta_S$, the rotational angle of the pinion shaft 66 is employed as the steering angle $\theta_S$ in the control of the present steering system. The steering angle $\theta_S$ and a cumulative amount of the steering-motor rotational angle $\theta_M S$ have a relationship to satisfy a predetermined speed reduction ratio, namely, a speed reduction ratio determined based on the speed reducer of the steering motor 58, the lead angle of the ball screw mechanism of the steering actuator 18, the diameter of the pinion shaft 66, etc. Thus, the conversion of the steering-motor rotational angle $\theta_{MS}$ to the steering angle $\theta_S$ is performed based on the speed reduction ratio. Though not described in detail, the present steering system includes a sensor (not illustrated) for detecting a rotational angle of the pinion shaft 66 from a rotational position of the pinion shaft 66 in the straight traveling state of the wheel 16. Based on the detection value by the sensor, a calibration of the steering angle $\theta_S$ converted by the steering angle converting portion 158 is performed at predetermined timing.

The target steering angle determining portion 150 determines a target steering angle $\theta_S^*$, which is a control target of the steering angle $\theta_S$, based on the operation angle $\theta_O$ converted by the operation angle converting portion 112 of the reaction force control section 100. The present steering system is capable of changing a steering gear ratio γ, namely, a ratio of the steering angle $\theta_S$ with respect to the operation angle $\theta_O$, depending upon the vehicle speed v. The target steering angle determining portion 150 determines the target steering angle $\theta_S^*$ based on the operation angle $\theta_O$ and the vehicle speed v referring to stored map data. The technique of changing the steering gear ratio γ is known, a detailed description of which is dispensed with.

The target steering angle $\theta_S^*$ determined by the target steering angle determining portion 150 is employed in the normal operation whereas the target steering angle $\theta_S^*$ based on the signal sent from the automatic parking controller 70 is employed in the automatic steering operation described above. The target steering angle changeover switch 152 is for switching the target steering angle $\theta_S^*$ to be employed. Though not described in detail, the target steering angle changeover switch 152 includes a determiner similar to the operation mode determiner 128 of the first switching portion 118 of the reaction force control section 100. Based on the determination made by the determiner, the target steering angle changeover switch 152 switches the target steering angle $\theta_S^*$ to be employed.

The steering torque determining portion 154 is a functional portion for determining a steering torque $Tq_S$ necessary for steering the wheel 16. The steering torque $Tq_S$ may be considered as a torque to be generated by the steering motor 58, for instance. Specifically, the steering torque determining portion 154 determines a steering angle deviation $\Delta\theta_S$, which is a deviation of the steering angle $\theta_S$ with respect to the target steering angle $\theta_S^*$, based on the target steering angle $\theta_S^*$ and an actual steering angle $\theta_S$ at the present time point converted by the steering angle converting portion 158. According to a PID feedback control law based on the thus determined steering angle deviation $\Delta\theta_S$, the steering torque determining portion 154 determines the steering torque $Tq_S$. The technique according to the feedback control law is known, a detailed description of which is dispensed with.

The steering-current control portion 156 includes an inverter that is a drive circuit (driver) for the steering motor 58. Based on the steering torque $Tq_S$ determined as described above, the steering-current control portion 156 determines the steering current Is, which is a current to be supplied to the steering motor 58, and supplies the steering current Is to the steering motor 58 from the inverter. The steering ECU 22 includes a current sensor 160 for detecting the steering current Is supplied to the steering motor 58. The steering current Is detected by the current sensor 160 is utilized in determining the steering-load-dependent component $Tq_{C-L}$ described above.

C. Urging Force in Normal Operation and Automatic Steering Operation and Changeover of Urging Force Between Normal Operation and Automatic Steering Operation The urging torque $Tq_C$ is controlled by the steering ECU 22 having the functional configuration described above, namely, the urging torque $Tq_C$ is controlled by the reaction force control section 100 of the steering ECU 22. As described above, the present steering system switches the operation mode between the normal operation and the automatic steering operation performed in automatic parking and switches the urging torque $Tq_C$ accordingly.

Figure 4:
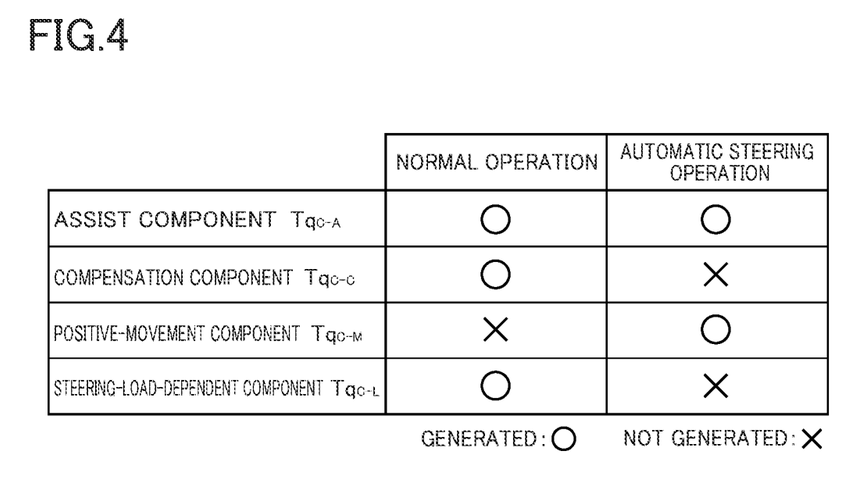
FIG. 4 is a table indicating whether or not to generate various components of an urging force applied to an operation member in each of a normal operation and an automatic steering operation.

More specifically, the first switching portion 118, the second switching portion 120, the third switching portion 124, the preliminary adder 122, the adder 116, and the final adder 126 switch, between the normal operation and the automatic steering operation, whether or not to generate the assist component $Tq_{C-A}$, the compensation component $Tq_{C-C}$, the positive-movement component $Tq_{C-M}$, and the steering-load-dependent component $Tq_{C-L}$, each of which is a component of the urging torque $Tq_C$, as illustrated in the table of FIG. 4. Specifically, the assist component $Tq_{C-A}$ is generated in both the normal operation and the automatic steering operation. The compensation component $Tq_{C-C}$ and the steering-load-dependent component $Tq_{C-L}$ are generated in the normal operation but are not generated in the automatic steering operation. The positive-movement component $Tq_{C-M}$ is not generated in the normal operation but is generated in the automatic steering operation.

It is particularly noted that the steering-load-dependent component $Tq_{C-L}$ is at least part of the non-generating component not generated in the automatic steering operation and is the counter-directional component with respect to the positive-movement component $Tq_{C-M}$. In the automatic steering operation, the steering-load-dependent component $Tq_C$ is not simply configured not to be generated but is canceled by adding the same component as the steering-load-dependent component $Tq_{C-L}$ input to the final adder 126 in the normal operation, to the adder 116 together with the positive-movement component $Tq_{C-M}$ via the preliminary adder 122. Consequently, the steering-load-dependent component $Tq_{C-L}$ is not generated in the automatic steering operation.

In the normal operation, the urging torque $Tq_C$ suitably functions as the reaction force torque $Tq_C$ against the operation of the steering wheel 10 performed by the vehicle driver owing to the assist component $Tq_{C-A}$, the compensation component $Tq_{C-C}$, and the steering-load-dependent component $Tq_{C-L}$, as apparent from the table of FIG. 4. In the automatic steering operation, the steering wheel 10 is appropriately moved so as to achieve the operation angle $\theta_O$ corresponding to the steering angle $\theta_S$ of the wheel 16 owing to the urging torque $Tq_C$ including the positive-movement component $Tq_{C-M}$. Because the compensation component $Tq_{C-C}$ and the steering-load-dependent component $Tq_{C-L}$ are not generated in the automatic steering operation, the appropriate movement of the steering wheel 10 is not impaired. That is, the steering wheel 10 is prevented from being inappropriately moved due to the compensation component $Tq_{C-C}$ and the steering-load-dependent component $Tq_{C-L}$. The assist component $Tq_{C-A}$ remains in the automatic steering operation. It is, however, noted that the assist component $Tq_{C-A}$ is a component based on the operation torque $Tq_O$ applied to the steering wheel 10 by the driver. In the automatic steering operation that does not depend on the operation of the steering wheel 10 by the driver, the assist component $Tq_{C-A}$ hardly influences the operation of the steering wheel 10. In summary, the present steering system is configured to generate the positive-movement component $Tq_{C-M}$ only in the automatic steering operation and not to generate, in the automatic steering operation, at least part of the plurality of components of the urging torque $Tq_C$ except for the positive-movement component $Tq_{C-M}$, i.e., the non-generating component.

When the normal operation is switched to the automatic steering operation, namely, at the start of the automatic steering operation, the bidirectional change-amount limiters 132 of the first switching portion 118 and the second switching portion 120 gradually increase the positive-movement component $Tq_{C-M}$ and gradually decrease the compensation component $Tq_{C-C}$. Similarly, when the automatic steering operation is switched to the normal operation, namely, at the end of the automatic steering operation, the bidirectional change-amount limiters 132 of the first switching portion 118 and the second switching portion 120 gradually decrease the positive-movement component $Tq_{C-M}$ and gradually increase the compensation component $Tq_{C-C}$. Thus, in the changeover between the normal operation and the automatic steering operation, the bidirectional change-amount limiters 132 prevent or reduce an abrupt movement of the steering wheel 10 that would be otherwise caused due to an abrupt change of the urging torque $Tq_C$.

Like the positive-movement component $Tq_{C-M}$, the steering-load-dependent component $Tq_{C-L}$ is gradually increased when the normal operation is switched to the automatic steering operation. Specifically, when the normal operation is switched to the automatic steering operation, namely, at the start of the automatic steering operation, the increasing-direction change-amount limiter 138 of the third switching portion 124 gradually increases the steering-load-dependent component $Tq_{C-L}$ input to the preliminary adder 122 for the cancellation described above. In contrast, when the automatic steering operation is switched to the normal operation, namely, at the end of the automatic steering operation, the resetter 140 of the third switching portion 124 immediately stops generating both the steering-load-dependent component $Tq_{C-L}$ input to the preliminary adder 122 for the cancellation and the steering-load-dependent component $Tq_{C-L}$ input to the final adder 126, in other words, the resetter 140 resets both the components to 0. The graphs of FIG. 5 respectively illustrate a change in the steering-load-dependent component $Tq_{C-L}$ input to the final adder 126, a change in the steering-load-dependent component $Tq_{C-L}$ input to the preliminary adder 122, a change in the positive-movement component $Tq_{C-M}$, and a change in a total urging torque $Tq_C$, with a lapse of time t. Here, the total urging torque $Tq_C$ is a sum of the steering-load-dependent component $Tq_{C-L}$ input to the final adder 126, the steering-load-dependent component $Tq_{C-L}$ input to the preliminary adder 122, and the positive-movement component $Tq_{C-M}$. In this respect, the steering-load-dependent component $Tq_{C-L}$ input to the final adder 126 is indicated as a negative value for clarifying that the steering-load-dependent component $Tq_{C-L}$ input to the final adder 126 is the counter-directional component. The value of the positive-movement component $Tq_{C-M}$ in the automatic steering operation is a value sufficient and necessary for moving the steering wheel 10. The steering-load-dependent component $Tq_{C-L}$ determined by the steering-load-dependent component determining portion 110 remains to a considerable extent at the end of the automatic steering operation.

Figure 5:
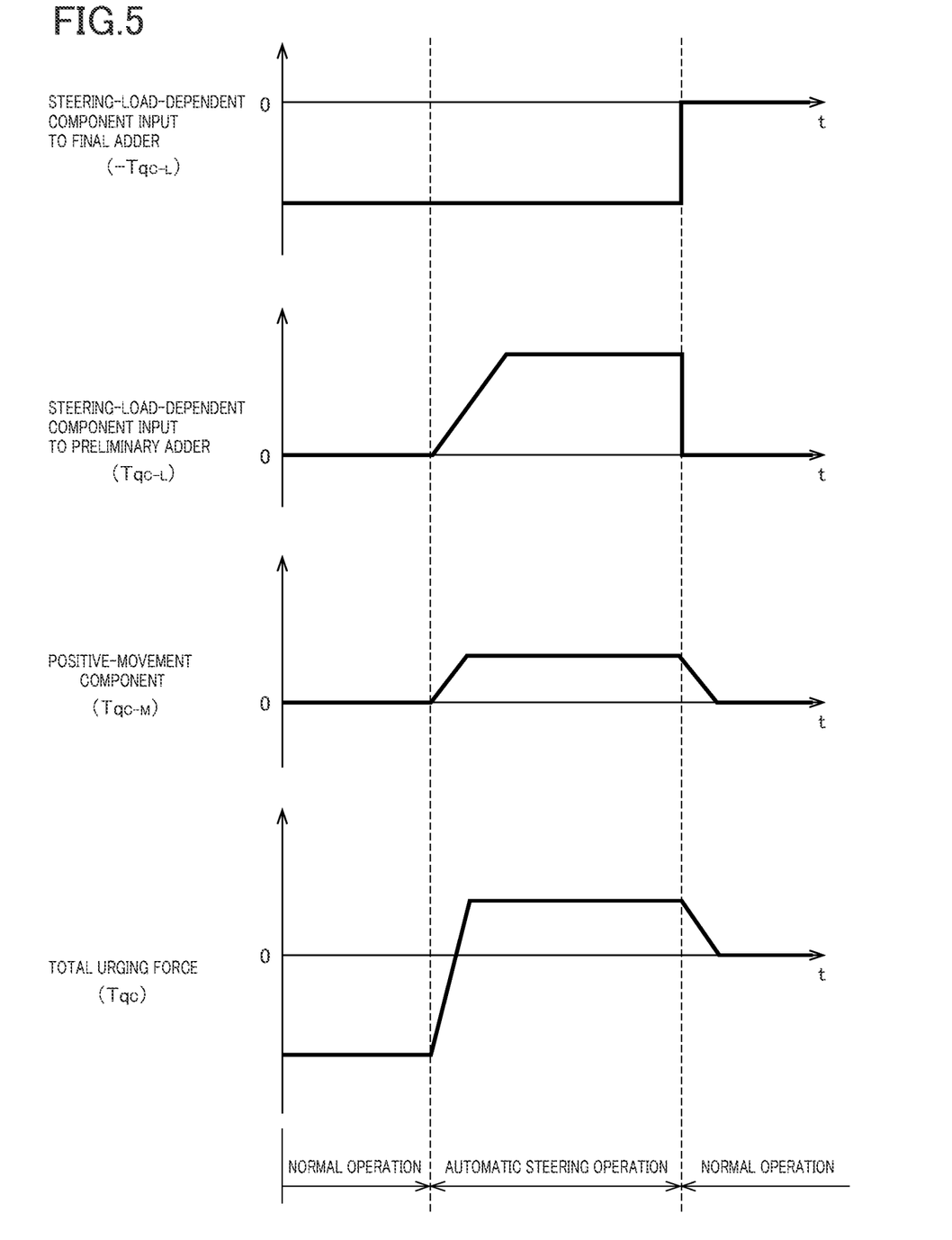
FIG. 5 illustrates graphs showing a change in the urging force applied to the operation member and changes in some components of the urging force, in a changeover between the normal operation and the automatic steering operation.

As illustrated in the graph of FIG. 5, in the automatic steering operation, the steering-load-dependent component $Tq_{C-L}$ is canceled as described above, and the change in the steering-load-dependent component $Tq_{C-L}$ does not adversely influence the movement of the steering wheel 10 by the positive-movement component $Tq_{C-M}$. Even when the wheel 16 is located at the neutral position in automatic parking, for instance, it is highly probable that the steering-load-dependent component $Tq_{C-L}$ determined by the steering-load-dependent component determining portion 110 somewhat remains due to deformation of the tire, for instance. The remaining component may cause the steering wheel 10 to be unnecessarily or inappropriately moved when the automatic steering operation is switched to the normal operation. In the present steering system, the steering-load-dependent component $Tq_{C-L}$ is reset to 0 at the end of the automatic steering operation, thus obviating the unnecessary movement of the steering wheel 10 caused by the steering-load-dependent component $Tq_{C-L}$ otherwise remaining at the end of the automatic steering operation. The steering-load-dependent component $Tq_{C-L}$ in the urging torque $Tq_C$ is made equal to 0 by the cancelation described above in the automatic steering operation. Thus, even if the steering-load-dependent component $Tq_{C-L}$ is abruptly reset to 0 at the end of the automatic steering operation, the urging torque $Tq_C$ is not influenced.

What is claimed is:

1. A steer-by-wire steering system for a vehicle, comprising:
    an operation member operable by a driver of the vehicle;
    an urging device configured to generate an urging force to urge the operation member;
    a steering device configured to steer a wheel that is not mechanically coupled to the operation member; and
    a controller configured to control the urging device and the steering device,
    wherein, in a normal operation, the controller enables the wheel to be steered in accordance with an operation of the operation member and causes the urging force to function as an operation reaction force against the operation of the operation member,
    wherein, in an automatic steering operation in which the wheel is steered without depending on the operation of the operation member, the controller enables the operation member to be moved in accordance with steering of the wheel by the urging force and causes at least part of the urging force generated in the normal operation not to be generated, and
    wherein the at least part of the urging force comprises a steering-load-dependent component as a component that is based on an axial force that acts on a steering rod or a rack bar and that includes a force that acts on the wheel from a road surface, the steering-load-dependent component acting in a direction opposite to an operation direction of the operation member.

2. The steer-by-wire steering system according to claim 1, wherein the automatic steering operation is an operation of the steering system performed in automatic parking of the vehicle.

3. The steer-by-wire steering system according to claim 1,
    wherein the urging force includes a plurality of components, one of which is a positive-movement component for causing the operation member to positively move in accordance with the steering of the wheel, and
    wherein the controller causes the positive-movement component to be generated only in the automatic steering operation and causes a non-generating component not to be generated in the automatic steering operation, the non-generating component being at least part of the plurality of components except for the positive-movement component.

4. The steer-by-wire steering system according to claim 3, wherein the plurality of components includes an assist component for assisting the operation of the operation member by the driver, a compensation component for compensating an operation feeling of the operation member given to the driver, and a steering-load-dependent component that is based on a load of the steering device with respect to the steering of the wheel.

5. The steer-by-wire steering system according to claim 3, wherein the controller gradually increases the positive-movement component when the automatic steering operation starts and gradually decreases the positive-movement component when the automatic steering operation ends.

6. The steer-by-wire steering system according to claim 3, wherein the controller gradually decreases the non-generating component when the automatic steering operation starts.

7. The steer-by-wire steering system according to claim 3, wherein, in the automatic steering operation, the controller keeps generating at least part of the non-generating component and adds, to the positive-movement component, a canceling component for canceling the at least part of the non-generating component.

8. The steer-by-wire steering system according to claim 7, wherein the controller immediately stops generating both the canceling component and the at least part of the non-generating component when the automatic steering operation ends.

9. The steer-by wire steering system according to claim 3, wherein the positive-movement component is determined according to a feedback control law based on a deviation of an actual operation amount of the operation member with respect to a target operation amount of the operation member, and an operation amount of the operation member corresponding to a steering amount of the wheel is determined as the target operation amount.

\* \* \* \* \*